(12) United States Patent
Spataro et al.

(10) Patent No.: US 8,748,522 B2
(45) Date of Patent: Jun. 10, 2014

(54) SOLUTION PROCESS FOR THE OLEFINS POLYMERIZATION

(75) Inventors: Stefano Spataro, Ferrara (IT); Pier Luigi Di Federico, Ferrara (IT); Giampaolo Pellegatti, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 252 days.

(21) Appl. No.: 13/129,876

(22) PCT Filed: Nov. 11, 2009

(86) PCT No.: PCT/EP2009/064976
§ 371 (c)(1),
(2), (4) Date: Jul. 13, 2011

(87) PCT Pub. No.: WO2010/060799
PCT Pub. Date: Jun. 3, 2010

(65) Prior Publication Data
US 2011/0263807 A1    Oct. 27, 2011

Related U.S. Application Data

(60) Provisional application No. 61/200,604, filed on Dec. 2, 2008, provisional application No. 61/203,204, filed on Dec. 19, 2008.

(30) Foreign Application Priority Data

Nov. 25, 2008   (EP) .................................... 08169894

(51) Int. Cl.
*C08K 5/51* (2006.01)
*C08F 10/04* (2006.01)

(52) U.S. Cl.
USPC ....................................... 524/128; 526/348.6

(58) Field of Classification Search
USPC ......................................................... 524/128
See application file for complete search history.

(56) References Cited

U.S. PATENT DOCUMENTS

| | | | |
|---|---|---|---|
| 4,666,994 A | 5/1987 | Zboril | |
| 4,711,923 A | 12/1987 | Zboril | |
| 5,324,798 A * | 6/1994 | Sanders et al. | 524/570 |
| 5,756,609 A | 5/1998 | Cohen | |
| 6,160,060 A * | 12/2000 | Holliday et al. | 526/68 |
| 6,228,790 B1 | 5/2001 | Ting et al. | |
| 7,671,131 B2 * | 3/2010 | Hughes et al. | 525/191 |
| 7,906,614 B2 | 3/2011 | Vanspeybroeck | |
| 7,985,799 B2 * | 7/2011 | Resconi et al. | 525/53 |
| 8,128,886 B2 | 3/2012 | Appel et al. | |
| 2007/0069415 A1 | 3/2007 | Moriyama et al. | |
| 2008/0319130 A1 * | 12/2008 | Chang | 525/88 |
| 2009/0209719 A1 * | 8/2009 | Vanspeybroeck | 526/348 |

FOREIGN PATENT DOCUMENTS

| | | |
|---|---|---|
| EP | 0604958 | 7/1994 |
| JP | S61-287947 | 12/1986 |
| JP | S61287947 | 12/1986 |
| JP | H06234808 | 8/1994 |
| JP | 2000169492 | 6/2000 |
| JP | 2001523275 | 11/2001 |
| JP | 2005-179556 | 7/2005 |
| JP | 2005179556 | 7/2005 |
| JP | 2009-503171 | 1/2009 |
| JP | 2009-541530 | 11/2009 |
| WO | WO-0113381 | 2/2001 |
| WO | WO-04000891 | 12/2003 |
| WO | WO-04000895 | 12/2003 |
| WO | WO-2005058979 | 6/2005 |
| WO | WO-2006101926 | 9/2006 |
| WO | WO2007/014842 | 2/2007 |
| WO | WO-2007094866 | 8/2007 |
| WO | WO2007/149275 | 12/2007 |
| WO | WO-2007149274 | 12/2007 |

\* cited by examiner

*Primary Examiner* — Hui Chin

(57) ABSTRACT

A process for the polymerization of one or more olefins under solution polymerization conditions to produce a polymeric solution, said process comprising contacting the produced polymeric solution with one or more antioxidant compounds before or concurrently with subjecting the polymeric solution to a devolatilization step to separate the polymer from the unreacted monomers.

10 Claims, 2 Drawing Sheets

150° C., and a ratio between the molecular weight (MW) and the number of hydroxy groups ($n_{OH}$) comprised between 20 and 100. The# SOLUTION PROCESS FOR THE OLEFINS POLYMERIZATION This application is the U.S. national phase of International Application PCT/EP2009/064976, filed Nov. 11, 2009, claiming priority to European Application 08169894.6 filed Nov. 25, 2008, and European Application 08171632.6 filed Dec. 15, 2008; and the benefit under 35 U.S.C. 119(e) of U.S. Provisional Application No. 61/200,604, filed Dec. 2, 2008 and U.S. Provisional Application No. 61/203,204, filed Dec. 19, 2008; the disclosures of International Application PCT/EP2009/064976, European Application 08169894.6, European Application 08171632.6, U.S. Provisional Application No. 61/200,604 and U.S. Provisional Application No. 61/203,204, each as filed, are incorporated herein by reference.

The present invention relates to a process comprising the polymerization of α-olefins in a solution phase. In particular, it relates to α-olefin solution polymerization wherein the obtained polymeric solution is subjected to devolatilization in order to remove the unreacted monomers from the polyolefin.

It is known that when the polymerization of one or more olefins is carried out in a solution phase, a solution of a polyolefin in the reaction medium is withdrawn from the polymerization reactor. The reaction medium comprises the liquid monomers and optionally, depending on the α-olefin to be polymerized, an inert hydrocarbon solvent, which can be used to favor the solubility of the obtained polymer in the liquid medium. Highly viscous polymeric solutions are discharged from the polymerization reactor, the viscosity being generally comprised between 1000 and 100000 centiPoises.

Butene-1 (co)polymers are well known and are preferably produced by means of solution polymerization of butene-1 in the presence of coordination catalysts, which are generally referred to as Ziegler-Natta catalysts. Butene-1 (co)polymers are mainly used in the manufacture of molded products such as pipes, packaging films, adhesives. The solution polymerization is generally carried out in liquid butene-1 at conditions under which a solution of polybutene-1 in butene-1 is discharged from the polymerization reactor. The polymerization reaction may be performed in one or more continuously stirred tank reactors or static mixer reactors (SMR).

The bulk polymerization of butene-1, i.e. without the use of any inert hydrocarbon solvent, is feasible since polybutene-1 dissolves in butene-1 at relatively low temperatures. Furthermore, the two components of the solution perfectly mix together at the optimum working temperatures of a Ziegler-Natta or a single-site catalyst system. In order to obtain the best performance of the polymerization catalyst together with a complete miscibility of monomer and polymer, the polymerization temperature in step a) is generally kept at a value comprised in the range of from 65 to 85° C., while the pressure is generally comprised between 8 and 40 bar.

The solution polymerization of olefins necessarily requires the successive separation of the obtained polyolefin from the unreacted monomers. The monomer recovery is generally carried out in a separation step wherein high temperatures, of about 150-250° C., are required. Before such a separation step, a deactivation of the catalyst residues is therefore necessary in order to avoid an undesired modification of the properties of the final polymer due to a further uncontrolled polymerization of the monomers and/or a thermal degradation of the polymer. The patent application WO 04/000895 describes the liquid-phase polymerization of butene-1 to produce a solution of polybutene-1 in butene-1, the polymerization being carried out in one or more stirred tank reactors. The polymeric solution is discharged from the polymerization reactor and is conveyed to a deactivation step of the catalyst residues, which is preferably carried out in a deactivation apparatus equipped with a sequence of mixing stages. A catalyst deactivator is mixed to the polymer solution, the catalyst deactivator being an organic compound having at least a hydroxy group, a boiling point higher than 150° C., and a ratio between the molecular weight (MW) and the number of hydroxy groups ($n_{OH}$) comprised between 20 and 100. The catalyst deactivator is preferably selected from propylen glycol, dipropylen glycol, glycerol, diethylen glycol, butandiol.

Also the description of WO 05/058979 relates to the catalyst deactivation of a polymeric solution obtained by a liquid-phase polymerization of butene-1. This application faces the problems correlated with the high viscosity of the polymer solution to be deactivated and consequent difficulty in pursuing a homogeneous mixing of the catalyst deactivator with the highly viscous polymer solution. The problem is solved by using a catalyst deactivator with a high viscosity, in particular an aqueous mixture with a dynamic viscosity at 30° C. higher than 50 cP (centiPoise) and comprising one or more organic compounds having at least a hydroxy or epoxy group. Preferably, said aqueous mixture comprises one or more alkyldiethanolammines of formula R—N(CH$_2$CH$_2$OH)$_2$, wherein R is an alkyl radical C$_{12}$-C$_{18}$.

The patent application WO 04/000891 describes a method for removing the unreacted butene-1 from a solution of polybutene in butene-1 coming from a solution polymerization reactor. The polymeric solution is first subjected to heating and mixing conditions, so as to form a two-phase mixture consisting of a polybutene melt and supercritical gaseous butene-1, then said two-phase mixture is transferred to a sequence of two devolatilization chambers operated at a decreasing pressure. In particular, both the volatilizers are operated at a high temperature, in the order of 200-220° C., and the second volatilizer is operated under vacuum. According to the working examples of this application, an antioxidant compound (Irganox® 1010) is added to the polymer melt discharged from the second volatilizer and is fed into a static mixer used to perform the polymer extrusion.

The Applicant has performed further experimental work on the devolatilization method described in WO 04/000891 and has observed that, notwithstanding the deactivation of the catalyst residues upstream the devolatilization chambers, the final polymer pellets may show values of melt index (MI), polidispersity index (PI) and molecular weight distribution (MWD) substantially different from the values measured at the outlet of the polymerization reactor: as a consequence, the mechanical properties of the obtained polyolefin differ considerably from the targeted properties.

The above drawback is probably due to the severe operative conditions maintained inside the two volatilization chambers (temperatures of 200-220° C. with a residence time of 3-4 hours), which may cause phenomena of thermal degradation of the polymeric chains. Above all, the second devolatilization chamber is operated under vacuum conditions (10-50 mbar), so that it is very difficult to maintain this volatilization chamber completely sealed: air infiltrations from outside may bring little amounts of oxygen in contact with the polymeric chains, with consequent breakage of the chains and modification of the values of melt index, PI and MWD of the polyolefin.

It is therefore felt the need to improve the process described in WO 04/000891, so as to solve the above technical problem, which is caused by the severe operative conditions adopted when subjecting a polyolefin solution to devolatilization.

The Applicant has now found that the use of antioxidant compounds downstream the solution polymerization of α-olefins allows to maintain substantially unaltered the physical properties of the obtained polyolefin when subjected to a melt devolatilization technique.

It is therefore an object of the present invention a process for the polymerization of one or more olefins under solution polymerization conditions to produce a polymeric solution, said process comprising contacting the produced polymeric solution with one or more antioxidant compounds before or concurrently while subjecting the polymeric solution to a devolatilization step to separate the polymer from the unreacted monomers.

According to the invention the above devolatilization step may be carried out in a sequence of a first and a second devolatilization chamber. In this case, the polymeric solution is preferably contacted with one or more antioxidant compounds inside the first devolatilization chamber. The polymeric solution coming from the reactor is generally subjected to a deactivation step, wherein the polymeric solution is contacted with a catalyst deactivator, said deactivation step taking place before contacting the polymeric solution with the one or more antioxidant compounds.

According to a preferred embodiment the solution process of the invention comprises:
(a) polymerizing said one or more α-olefins in a solution phase in the presence of a polymerization catalyst to produce a polymeric solution;
(b) conveying the polymeric solution to a deactivation tank, where a catalyst deactivator is mixed with the polymeric solution;
(c) separating the produced polyolefin from the unreacted monomers by means of a devolatilization step comprising a first and a second devolatilization chamber;
the process being characterized in that one or more antioxidant compounds are added to said polymeric solution upstream the devolatilization step (c) or alternatively inside the first devolatilization chamber of step (c).

The process of the invention is aimed to neutralize the detrimental effects due to the presence of oxygen inside the volatilization chambers of the above defined step c).

According to a first embodiment one or more antioxidant compounds are added to the polyolefin directly inside the first volatilization chamber of step c). As known to those skilled in the art, a volatilization chamber is operated in such a way that the polymer settles downwards as a "polymer melt", while the monomers and optional polymerization solvents flow upward to the top of the volatilization chamber. With the term "polymer melt" is meant an olefin polymer in the molten state: in spite of its very high viscosity (of about $20 \times 10^6$ cP), said polymer melt is still able to be pumped by means of a gear pump. In particular, the polymer melt collects in the lower portion of the volatilizer, while the unreacted monomers are released from the upper surface of the polymer melt, so that a high turbulence regime is established inside the polymer melt. This high turbulence contributes to mix homogeneously the antioxidant compounds with the polyolefin, so as to favor an intimate contact of the antioxidant compound with the polyolefin.

According to a second embodiment of the present invention one or more antioxidant compounds are added to the polymeric solution upstream the devolatilization step (c). In both the first and second embodiment of the invention, the positive effect of the invention is the consequent reaction of these antioxidant compounds with the oxygen, which penetrates inside the volatilization chambers of step c): said reaction brings to the formation of by-products, which differently from oxygen, do not interfere with the polymer chains of the produced polyolefin and do not modify their physical properties.

According to a preferred embodiment of the invention, the antioxidant compounds are added to the polymer solution downstream the deactivation step (b) and upstream the devolatilization step (c).

The antioxidant compounds preferably used in the solution polymerization of the invention are selected from the group of sterically hindered phenols, phospithes, thioesters.

The suitable compounds belonging to the class of sterically hindered phenols are:
tetrakismethylene(3,5-di-t-butyl-4-hydroxyhydrocinnamate) methane, sold under the trademark IRGANOX® 1010;
octadecyl 3-(3',5'-di-butyl-4' hydroxyphenyl)propionate (IRGANOX® 1076);
1,3,5-tris(3,5-di-t-butyl-4-hydroxybenzyl)benzene (IRGANOX® 1030);
1,3,5-tris(3,5-di-t-butyl-4-hydroxybenzyl)isocyanurate (IRGANOX® 3114);
2,6-bis(α-methylbenzyl)-4-methylphenol (Naugard® 431);
1,3,5-tris(4-tert-butyl-3-hydroxy-2,6-dimethylbenzyl)-1,3,5-triazine-2,4,6-(1H,3H,5H)-trione (CYANOX® 1790);
2,2'-methylenebis(4-ethyl-6-tert-butylphenol) (CYANOX® 425)
2,2'-methylenebis(4-methyl-6-tert-butylphenol) (CYANOX® 2246)

The suitable compounds belonging to the class of phospithes are:
tris(2,4-di-t-butyl phenyl)phosphite (Irgafos 168)
bis(2,4-ditertbutylphenol)pentaerythritol diphosphite (Ultranox® 626)
tris(nonylphenyl)phosphite (Alkanox TNPP);
2,4,6-tri-t-butylphenyl-2-butyl-2-ethyl-1,3 propane-diolphosphite (ULTRANOX® 641);
bis(2,4-dicumylphenyl)pentaerythritol diphosphite (Doverphos® S-9228)

The suitable compounds belonging to the class of thioesters are:
dialkyl ester of thiodipropionic acid (Irganox® PS 802);
didodecyl-3,3'-thiodipropionate (Irganox® PS 800).

Particularly preferred antioxidant compounds used in the present invention are IRGANOX® 1010 and IRGANOX® 1076.

The above compounds are generally added to the polymer at a temperature such that the antioxidant compound is in a liquid state. For most of these compounds the suitable feeding temperature is from 50° C. to 100° C., preferably from 60° C. to 90° C.

The suitable amount of antioxidant compounds ranges from 300 to 2000 ppm by weight, preferably from 500 to 1200 ppm, with respect to the polyolefin produced in the polymerization step a).

As regards the polymerization step a) one or more α-olefins of formula $CH_2$=CHR, where R is hydrogen or a hydrocarbon radical $C_{1-8}$, are subjected to polymerization in a solution phase. The polymerization reaction may be performed in one or more continuously stirred tank reactors or static mixer reactors (SMR). A solution of a polyolefin in the reaction medium is obtained from the polymerization reactor. The reaction medium comprises the liquid monomers and optionally, depending on the α-olefin to be polymerized, an inert hydrocarbon solvent, which can be used to favor the solubility of the obtained polymer in the liquid medium. The catalyst system used in the polymerization step may be a Ziegler-Natta catalyst system and/or a single-site catalyst system comprising an alumoxane compound as the cocatalyst.

The alpha-olefin to be polymerized in step a) is preferably butene-1 or propylene. When butene-1 is to be polymerized, the bulk polymerization in the liquid monomer is the preferred one, without using any inert hydrocarbon solvent. The bulk polymerization is feasible since polybutene-1 dissolves in butene-1 at relatively low temperatures. Furthermore, the two components of the solution perfectly mix together at the optimum working temperatures of a Ziegler-Natta or a single-site catalyst system. In order to obtain the best performance of the polymerization catalyst together with a complete miscibility of butene-1 and polybutene-1, the polymerization temperature in step a) is generally kept at a value comprised in the range of from 65 to 85° C., while the pressure is generally comprised between 8 and 40 bar. The residence time of the liquid inside the reactor is generally comprised between 30 minutes and 4 hours, preferably between 2 and 3 hours.

When propylene is to be polymerized, step (a) is carried out in liquid monomer, preferably together with a polymerization solvent selected from a paraffinic, isoparaffinic, naphtenic, or aromatic hydrocarbon solvent, which has the function to foster the solubility of the obtained polypropylene in the polymerization medium. Suitable polymerization solvents are, for example, toluene, cyclohexane, hexane, heptane, octane, nonane, isooctane, ethylbenzene, isopentane and Isopar™, which is a $C_8$-$C_{10}$ hydrocarbon mixture. Depending on the selected solvent and catalyst system, the polymerization of propylene is generally operated at a high temperature, generally in a range from 80 to 180° C., preferably from 90 to 130°, at a high pressure, generally in a range from 20 to 80 bar, preferably from 25 to 60 bar. The residence time of the liquid inside the reactor is generally comprised between 10 minutes and 90 minutes, preferably between 20 minutes and 60 minutes.

A highly viscous polymeric solution is discharged from the polymerization reactor of step a): the viscosity of the polymeric solution is generally comprised between 1000 and 100000 centiPoises.

The obtained polymeric solution is transferred to step b) of present invention aimed to deactivate the catalyst components contained in the polymer solution. The catalyst deactivation can be performed in one or more mixing tanks placed in series or, alternatively, in a single deactivation apparatus equipped with a sequence of more mixing stages. In the case of polymerization carried out in the presence of a Ziegler-Natta catalyst, any of the deactivating compounds known in the art can be employed. Suitable deactivating compounds are water or organic compounds with a boiling point higher than 150° C. and at least a hydroxy group. Examples of preferred deactivating compounds are water, propylenglycol, dipropylenglycol, glycerol; more preferably water is used as the deactivator.

The deactivated polymer solution is discharged from the deactivation tank and is transferred by means of a volumetric pump to the successive separation step c), where unreacted monomers and the polymerization solvents, if present, are recovered and re-circulated to the polymerization reactor of step a).

The polymeric solution discharged from the deactivation tank of step b) is transferred by means of a volumetric pump, preferably a screw pump, to the separation step c). The melt devolatilization technique of step c) requires the heating of the polymer solution at high values of temperature. Therefore, the polymeric solution is first pressurized by means of said screw pump to a pressure ranging from 40 to 100 bar, and then it is heated in one or more heat exchangers to raise its temperature to values comprised between 150 and 300° C., this value of temperature being bound to the volatility of the specific monomers and solvents to be recovered. One or more multi-tube heat exchangers, optionally containing static mixing elements inside each tube can be used to this purpose, as described in the Patent Application WO 04/000891 in the name of the same Applicant.

Preferably, the antioxidant compounds of the invention are added to the polymer solution along the line connecting the above screw pump to said first volatilization chamber of step c). Preferably, a sequence of a first and a second volatilizer operating at a decreasing pressure is used in step c). The first volatilizer is operated at a pressure higher than the atmospheric pressure and the second one is operated under vacuum: by this technique a polymer melt substantially free of monomers and polymerization solvents is obtained at the outlet of the second volatilizer.

The present invention will be, thereafter, described in more details with reference to the enclosed FIGS. 1-2, which are illustrative and non-limitative of the scope of the invention and refer in particular to a solution process for polymerizing butene-1 as the main monomer.

Figure 1:
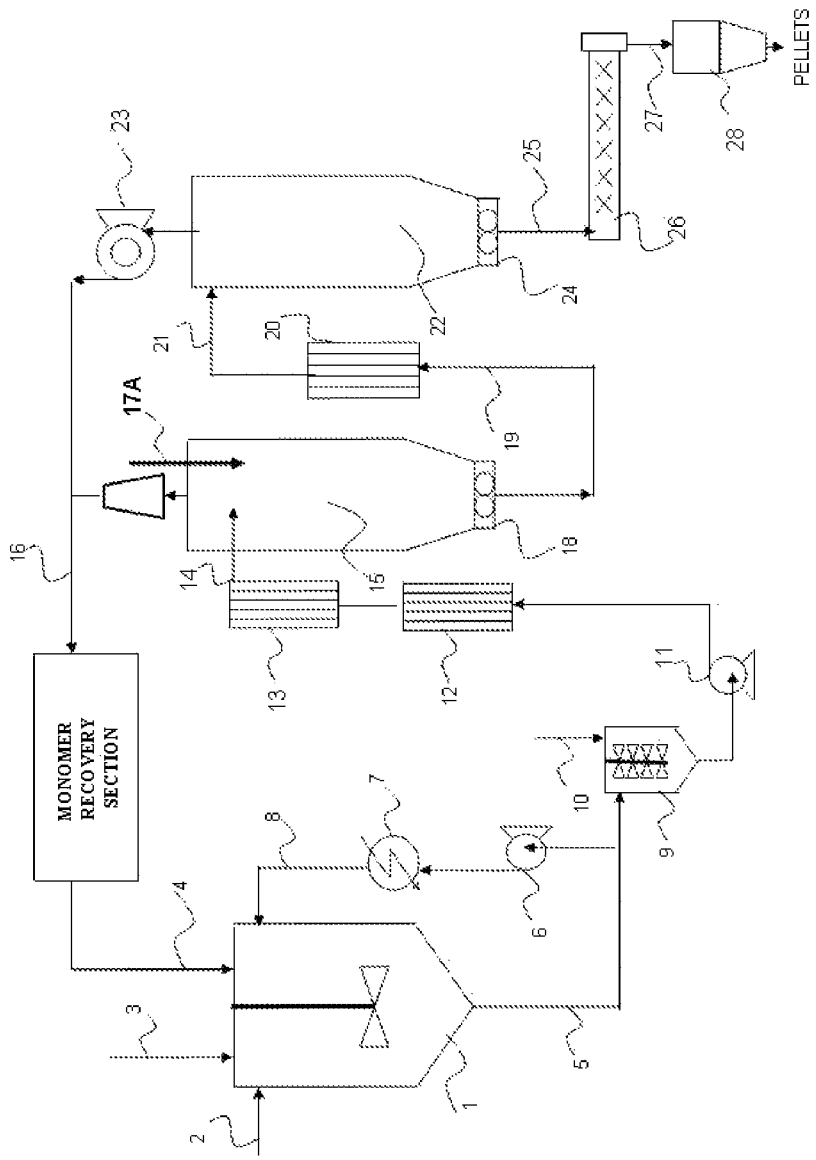
FIG. 1 shows a first embodiment of the process of the invention, where the antioxidant compounds are added to the polyolefin in correspondence of the first volatilization chamber of step c).

According to the process set-up shown in FIG. 1 the solution polymerization of step a) of the invention is performed in a continuously stirred tank reactor 1. A transition metal compound, optionally supported on a carrier, an aluminum alkyl compound and optionally an electron donor compound are first pre-contacted in one or more pre-contacting pots (not shown) and then fed to the continuously stirred tank reactor 1 via line 2.

A liquid stream containing liquid butene-1, and optionally olefin comonomers, is introduced into the polymerization reactor 1 via line 3. The olefin monomers coming from the monomer recovery section are recycled to the reactor 1 via line 4.

A highly viscous solution of a polybutene-1 in butene-1 is discharged via line 5 from the reactor 1. Part of the polymeric solution is continuously recycled to the reactor 1 by a pump 6, which conveys the polymeric solution into a heat exchanger 7 and then, after suitable cooling, is recycled to the polymerization reactor 1 via line 8.

The remaining part of polymeric solution discharged from the reactor 1 is conveyed to a deactivation tank 9, where is contacted with a catalyst deactivator, such as water, fed in a suitable amount to the tank 9 via line 10. After the catalyst deactivation, the solution of polybutene-1 in butene-1 is pressurized in order to contrast the head loss along the successive heating stage. The polymer solution is pressurized and transferred by means of a screw pump 11 to a sequence of two multitube heat exchangers 12, 13, where the polymer solution is heated at the high temperatures required to perform the devolatilization step c).

The polymeric solution is pumped by the screw pump 11 to the inlet of a first heat exchanger 12. The heat exchanger 12 is a multi-tube heat exchanger with static mixing elements inserted inside each tube: the heating fluid is preferably steam. By means of heat exchanger 12 the temperature of the polymeric solution is slowly increased without substantially to evaporate the liquid monomer with the purpose of decreasing considerably the viscosity of the polymer solution.

The solution of polybutene-1 in butene-1 exits the heat exchanger 12 and enters a second heat exchanger 13, which is a multi-tube heat exchanger using a diathermic oil as the heating fluid. During the passage along the tubes of the heat exchanger 13 the polymer solution is heated in such a way that at the outlet of the heat exchanger 13 a two-phase mixture is obtained consisting substantially of: (1) polybutene melt containing entrapped butene-1 and (2) supercritical gaseous butene-1.

The two-phase mixture coming from the heat exchanger 13 is then passed to the devolization step c) of present invention, carried out in a sequence of two volatilizers operating at decreasing pressures.

The polymeric stream exiting from the heat exchanger 13 is introduced via line 14 at the top of a first volatilizer 15, which is operated at a temperature of 170-220° C. and a pressure from 2 to 12 bar.

In said first volatilizer 15 the evaporated monomers are separated from the polymeric components: a polymer melt settles downwards at the bottom part of the volatilizer 15, while the evaporated monomers are realized away from the polymer, flowing upward as a gaseous stream. The gas phase exiting the top of the volatilizer 15 is transferred via line 16 to the monomer recovery section of the polymerization plant. The monomer recovery section comprises one or more distillation columns to separate the heavy components from the light components, a drying unit, and recycle lines of liquid monomers to the polymerization reactor.

According to the embodiment of FIG. 1 one or more antioxidant compounds in a liquid form are fed via line 17A to the top of the first volatilizer 15 and fall on the surface of the polymer melt which occupies the bottom portion of the volatilizer 15. Due to high turbulence existing inside the volatilizer, said antioxidant compounds are intimately mixed with the polymer melt. A polymer melt additivated with the antioxidant compounds of the present invention is withdrawn from the bottom of the first volatilizer 15 by means of a gear pump 18 and transferred via line 19 into a heat exchanger 20, which adjusts the temperature of the polymer melt at the values requested in the second volatilizer. The polymer melt exiting the heat exchanger 20 is introduced via line 21 at the top of a second volatilizer 22, which is operated at a temperature of 170-220° C. and a pressure from 5 to 100 mbar. Said pressure values are maintained by means of the vacuum pump 23.

In the second volatilizer 22 the residual monomers are realized away from the polymer melt, which settles downwards at the bottom of the volatilizer 22. The unreacted monomers flow upward along the volatilizer 22: this gaseous stream collects at the top of the volatilizer 22 and is withdrawn by vacuum pump 23 and transferred via line 16 to the monomer recovery section.

A polymer melt, further purified from the unreacted monomers is withdrawn by means of a gear pump 24 from the bottom of the second volatilizer 22 and transferred via line 25 into a static mixer 26 to be subjected to extrusion. The static mixer 26 has the function of mixing the polymer melt with suitable additives, such as nucleating agents, pigments, etc. A side-arm extruder (not shown) can be used for melting and mixing each other the additives used for the polyolefin compounding. The compounded butene-1 (co)polymer exiting the static mixer 26 is then passed via line 27 to an underwater pelletizer 28, where it is cut into pellets by the action of rotating knife blades: the pellets are then cooled by means of cooling water.

Figure 2:
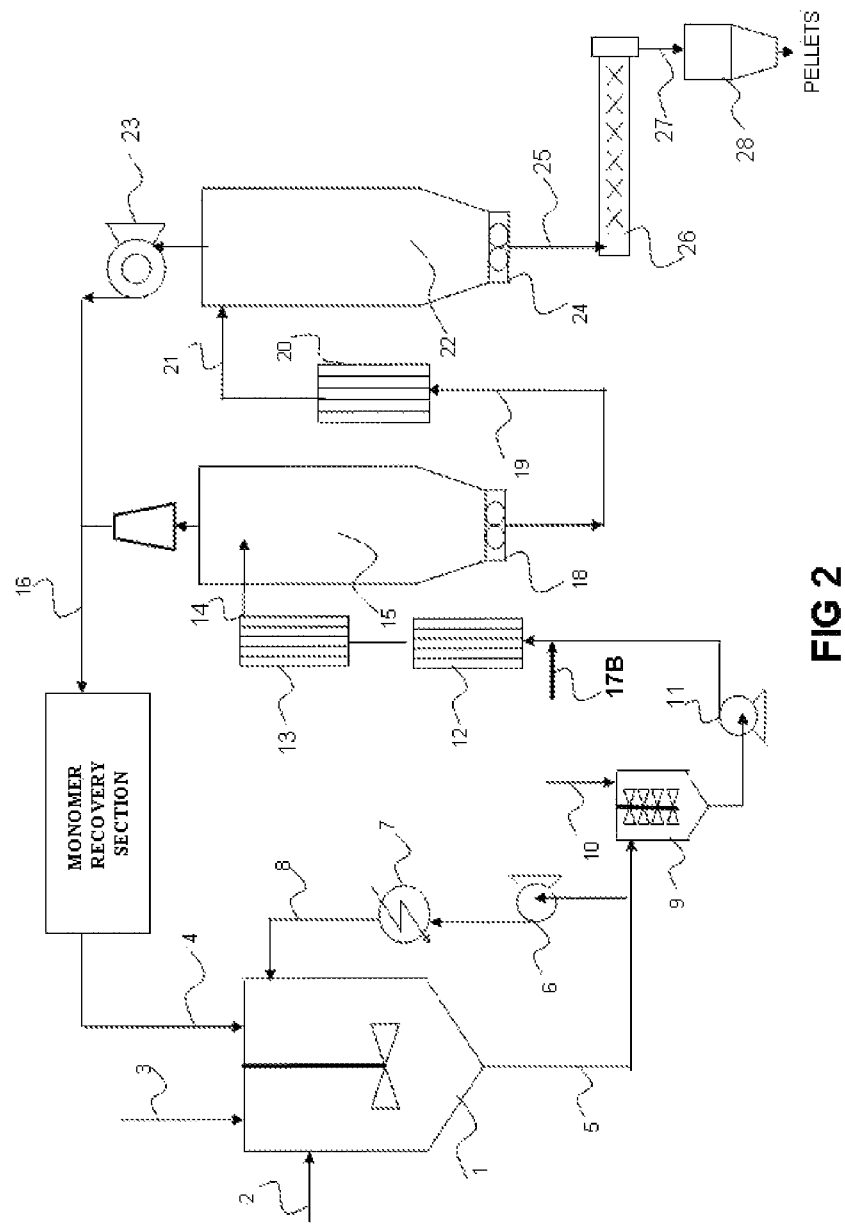
FIG. 2 shows a second embodiment of the process of the invention, where the antioxidant compounds are added to the polyolefin along the line connecting the catalyst deactivation tank to the first volatilization chamber.

FIG. 2 shows a second and alternative embodiment of the process of the invention, always referring to a solution polymerization of butene-1, as represented in FIG. 1. The only difference in the process set-up of FIG. 2 is due to the fact that the antioxidant compounds are added to the polyolefin solution via feed line 17B, which merges on the line connecting the catalyst deactivation tank 9 to the first volatilization chamber 15.

The olefin monomers polymerized by the process of the invention have formula $CH_2=CHR$, where R is hydrogen or a hydrocarbon radical having 1-12 carbon atoms. The process of the invention is particularly suitable to be exploited in the production of homopolymers and copolymers based on ethylene, propylene and 1-butene, especially when the obtained polyolefin is characterized by bimodality, so as to be successfully employed in the production of pipes.

The solution polymerization of olefins herewith described is not restricted to the use of any particular family of polymerization catalysts. The invention is useful in any exothermic polymerization reaction employing any catalyst, whether it is supported or unsupported, and regardless of whether it is in pre-polymerized form.

The polymerization reaction can be carried out in the presence of highly active catalytic systems, such as Ziegler-Natta catalysts, single site catalysts, chromium-based catalysts.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_n X_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2-Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, tri-isobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form. Particularly for the preparation crystalline polymers of $CH_2CHR$ olefins, where R is a C1 C10 hydrocarbon group, internal electron donor compounds can be supported on the $MgCl_2$. Typically, they can be selected among esters, ethers, amines, and ketones. In particular, the use of compounds belonging to 1,3-diethers, cyclic ethers, phthalates, benzoates, acetates and succinates is preferred.

It is also possible to use, besides the electron-donor present in the solid catalytic component, an external electron-donor (ED) added to the aluminium alkyl co-catalyst component or to the polymerization reactor. These external electron donors can be selected among alcohols, glycols, esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the C2-C20 aliphatic ethers and in particular the cyclic ethers preferably having 3-5 carbon atoms, such as tetrahydrofurane (THF), dioxane.

Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate.

The preferred alkoxysilanes are of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl.

Other useful catalysts are those based on chromium compounds, such as chromium oxide on silica, also known as Phillips catalysts.

Other suitable catalysts are single site catalysts, for instance metallocene-based catalyst systems which comprise:

at least a transition metal compound containing at least one π bond;
at least an alumoxane or a compound able to form an alkylmetallocene cation; and
optionally an organo-aluminum compound.

A preferred class of metal compounds containing at least one π bond are metallocene compounds belonging to the following formula (I):

$$Cp(L)_qAMX_p \quad (I)$$

wherein M is a transition metal belonging to group 4, 5 or to the lanthanide or actinide groups of the Periodic Table of the Elements; preferably M is zirconium, titanium or hafnium; the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms; preferably, the substituents X are selected from the group consisting of —Cl, —Br, -Me, -Et, -n-Bu, -sec-Bu, -Ph,-Bz, —CH$_2$SiMe$_3$, —OEt, —OPr, —OBu, —OBz and —NMe$_2$;
p is an integer equal to the oxidation state of the metal M minus 2;
n is 0 or 1; when n is 0 the bridge L is not present;
L is a divalent hydrocarbon moiety containing from 1 to 40 carbon atoms, optionally containing up to 5 silicon atoms, bridging Cp and A, preferably L is a divalent group $(ZR^7_2)_n$; Z being C, Si, and the $R^7$ groups, equal to or different from each other, being hydrogen or a hydrocarbon radical containing from 1 to 40 carbon atoms;
more preferably L is selected from Si(CH$_3$)$_2$, SiPh$_2$, SiPhMe, SiMe(SiMe$_3$), CH$_2$, (CH$_2$)$_2$, (CH$_2$)$_3$ or C(CH$_3$)$_2$;
Cp is a substituted or unsubstituted cyclopentadienyl group, optionally condensed to one or more substituted or unsubstituted, saturated, unsaturated or aromatic rings;
A has the same meaning of Cp or it is a NR$^7$, —O, S, moiety wherein $R^7$ is a hydrocarbon radical containing from 1 to 40 carbon atoms;

Alumoxanes used as component b) are considered to be linear, branched or cyclic compounds containing at least one group of the type:

$$\begin{array}{c} U \\ \diagdown \\ Al-O-Al \\ \diagup \quad \diagdown \\ U \quad\quad U \end{array}$$

wherein the substituents U, same or different, are defined above.

In particular, alumoxanes of the formula:

$$\begin{array}{c} U \quad\quad U \quad\quad U \\ \diagdown \quad | \quad \diagup \\ Al-O-(Al-O)n^1-Al \\ \diagup \quad\quad\quad\quad \diagdown \\ U \quad\quad\quad\quad\quad U \end{array}$$

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number; or alumoxanes of the formula:

$$\begin{array}{c} U \\ | \\ (Al-O)n^2 \end{array}$$

can be used in the case of cyclic compounds, wherein $n^2$ is an integer from 2 to 40 and the U substituents are defined as above.

The following examples have to be considered representative and non-limiting of the scope of the invention.

EXAMPLES

Characterization

Melt Index E (MIE): ASTM-D 1238 Method E

Polydispersity index (P.I.): this property is strictly connected with the molecular weight distribution of the polymer under examination. In particular it is inversely proportional to the creep resistance of the polymer in the molten state. Said resistance, called modulus separation at low modulus value, i.e. 500 Pa, was determined at a temperature of 200° C. by using a parallel plates rheometer model RMS-800 marketed by RHEOMETRICS (USA), operating at an oscillation frequency which increases from 0.1 rad/s to 100 rad/s.

From the modulus separation value the PI is derivable by means of the equation:
P.I.=54.6*(modulus separation)$^{-1.76}$, where the modulus separation is defined as:
Modulus separation=(frequency at G'=500 Pa)/(frequency at G"=500 Pa)
where G' is the storage modulus and G" is the low modulus value.

Preparation of the Solid Catalyst Component

Into a 500 ml four-necked round flask, purged with nitrogen, 225 ml of TiCl$_4$ were introduced at 0° C. While stirring, 6.8 g of microspheroidal MgCl$_2$ 2.7C$_2$H$_5$OH (prepared as described in Ex. 2 of U.S. Pat. No. 4,399,054 but operating at 3,000 rpm instead of 10,000) were added. The flask was heated to 40° C. and 4.4 mmoles of diisobutylphthalate were thereupon added. The temperature was raised to 100° C. and maintained for two hours, then stirring was discontinued, the solid product was allowed to settle and the supernatant liquid was siphoned off.

200 ml of fresh TiCl$_4$ were added, the mixture was reacted at 120° C. for one hour, then the supernatant liquid was siphoned off and the solid obtained was washed six times with anhydrous hexane (6×100 ml) at 60° C. and then dried under vacuum. The catalyst component contained 2.8 wt % of Ti and 12.3 wt % of phthalate.

Example 1

Polymerization

Step A

The liquid-phase polymerization of butene-1 is performed in two continuously stirred tank reactors (CSTR) placed in series in the presence of a Ziegler-Natta polymerization catalyst comprising:
  a solid catalyst component based on a Titanium compound, prepared as above indicated;
  triisobutylaluminum (TIBA) as a catalyst activator;
  thexyltrimethoxysilane as a donor compound for the stereoregularity control.

The catalyst is fed exclusively to the first reactor of the two CSTR type reactors in series. Liquid butene-1 together with H$_2$ as a molecular weight regulator is continuously fed to the polymerization reactors. The polymerization conditions in the first and second reactors are reported in Table A, as well as the feeding ratio H$_2$/C$_4$H$_8$.

TABLE A

| Polymerization conditions | -1$^{st}$ Reactor | 2$^{nd}$ Reactor |
| --- | --- | --- |
| Temperature (° C.) | 71.5 | 75 |
| Pressure (bar) | 20 | 20 |
| Residence Time (min) | 103 | 67 |
| Polymer concentration (% weight) | 25 | 25 |
| H$_2$ (ppm mol) | 160 | 2050 |

26 t/h of a solution of polybutene in butene-1 with a polymer concentration of 25% by weight is discharged from the second polymerization reactor. A sample of polymeric solution is taken away at the outlet of the second reactor in order to evaluate the Melt Flow Index (MIE) and Polydispersity index (PI) of the obtained polybutene-1: MIE=0.35 and PI=7.0 were measured.

Deactivation

Step B

The PB-1 solution is transferred to a deactivation apparatus for the killing of the catalyst residues: 2.0 kg/h of H$_2$O, as the catalyst deactivator, is continuously fed to the top of the deactivation apparatus together with 26 t/h of polymeric solution.

Separation and Monomer Recovery

Step C

Once deactivated, the polymeric solution is successively pressurized by means of a screw pump and is then subjected to heating in a sequence of two multi-tube heat exchangers.

The first heat exchanger is provided with mixing rods inside each tube and uses steam at a temperature of 135° C. as the heating fluid. The second heat exchanger uses a diathermic oil (MARLOTHERM N) at 260° C. as the heating fluid.

At the outlet of the second heat exchanger a mixture of polybutene-1 melt and gaseous butene-1 is obtained. Said mixture is fed to the inlet of a first devolatilization chamber, operated a temperature of 210° C. and a pressure of 7 bar. The polybutene-1 melt settles by gravity to the bottom of the chamber, while the gaseous butene-1 flows upward.

According to the embodiment shown in FIG. 1 of present description antioxidant compounds are introduced into the first volatilizer. In particular, a mixture of IRGANOX® 1010 (70% wt) and IRGANOX® 1076 (30% wt) is fed to the bottom part of the first volatilizer. Said mixture is fed at a temperature of 75° C. and a flow rate of 3.25 kg/h (corresponding to 500 ppm weight referred to the polymer).

The PB-1 melt is therefore discharged from the bottom of the first volatilizer and is introduced into a heat exchanger in order to raise its temperature up to the value requested into the second devolatilization chamber.

The second devolatilization chamber is operated under vacuum at 210° C. and 25 mbar. At the outlet of the second volatilizer the content of butene-1 in the polybutene-1 melt is measured obtaining a value of only 40 ppm weight.

The polybutene-1 melt is compounded in an extruder and finally, the compounded polybutene-1 melt is conveyed to an underwater pelletizer to be cut into pellets. The values of MIE and PI of the obtained PB-1 pellets are reported in Table C, where MIE$^{(A)}$ and PI$^{(A)}$ refer to the polymer at the outlet of the polymerization step a), while MIE$^{(B)}$ and PI$^{(B)}$ refer to the polymer pellets. It may be observed that the process of the invention ensures a limited and negligible MIE shift and PI shift.

Example 2

The same solution of PB-1 in butene-1 obtained by the polymerization conditions of Example 1 is subjected to catalyst deactivation as described in Example 1.

Once deactivated, the polymeric solution is pressurized by means of a screw pump before to be subjected to heating in two multi-tube heat exchangers.

According to the embodiment shown in FIG. 2 of present description, antioxidant compounds are fed to the polymer solution along the line connecting the deactivation tank to the first volatilization chamber. In particular, a mixture of IRGANOX® 1010 (70% wt) and IRGANOX® 1076 (30% wt) is fed to the polymer solution downstream the screw pump and upstream the first heat exchanger. Said mixture is fed at a temperature of 75° C. and a flow rate of 3.25 kg/h (500 ppm wt referred to the polymer).

The temperature at the outlet of the second heat exchanger is 210° C. and a mixture of polybutene-1 melt and gaseous butene-1 is obtained. Said mixture is fed to the inlet of a first devolatilization chamber, operated a temperature of 210° C. and a pressure of 7 bar. The polybutene-1 melt settles by gravity to the bottom of the chamber, while the gaseous butene-1 flows upward.

The second devolatilization chamber is operated under vacuum at 210° C. and 25 mbar. At the outlet of the second volatilizer the content of butene-1 in the polybutene-1 melt is measured obtaining a value of only 40 ppm weight.

The polybutene-1 melt is compounded in an extruder and finally, the compounded polybutene-1 melt is conveyed to an underwater pelletizer to be cut into pellets.

The values of MIE and PI of the obtained PB-1 pellets are reported in Table C. It may be observed that the process of the invention ensures a limited and negligible MIE shift and PI shift.

Example 3

Comparative

The same solution of PB-1 in butene-1 obtained by the polymerization conditions of Example 1 is subjected to catalyst deactivation as described in Example 1.

Once deactivated, the polymeric solution is pressurized by means of a screw pump before to be subjected to heating in the same multi-tube heat exchangers of example 1.

The temperature at the outlet of the second heat exchanger is 210° C. and a mixture of polybutene-1 melt and gaseous butene-1 is obtained. Said mixture is fed to the inlet of a first devolatilization chamber, operated a temperature of 210° C. and a pressure of 7 bar. The polybutene-1 melt settles by gravity to the bottom of the chamber, while the gaseous butene-1 flows upward.

The second devolatilization chamber is operated under vacuum at 210° C. and 25 mbar. At the outlet of the second volatilizer the polybutene-1 melt is sent to an extruder, where it is additivated with a mixture of IRGANOX® 1010 (70% wt) and IRGANOX® 1076 (30% wt). Said mixture is fed at a flow rate of 3.25 kg/h.

Finally, the compounded polybutene-1 melt is conveyed to an underwater pelletizer to be cut into pellets. The values of MIE and PI of the obtained PB-1 pellets are reported in Table C. It may be observed that the final pellets show a considerable MIE shift and PI shift.

Example 4

Polymerization

Step A

The liquid-phase polymerization of butene-1 and ethylene is performed in two continuously stirred tank reactors (CSTR) placed in series in the presence of the same Ziegler-Natta catalyst of Example 1.

The catalyst is fed exclusively to the first reactor of the two CSTR type reactors in series. $H_2$ is used as a molecular weight regulator.

The polymerization conditions in the first and second reactor are reported in Table B, as well as the feeding ratios ethylene/butene-1 and hydrogen/butene-1.

TABLE B

| Polymerization conditions | -1$^{st}$ Reactor | 2$^{nd}$ Reactor |
|---|---|---|
| Temperature (° C.) | 75 | 75 |
| Pressure (bar) | 24 | 24 |
| Residence Time (min) | 102 | 102 |
| Polymer concentration (% wt) | 21.5 | 21.5 |
| $C_2H_4$ (% wt) | 3.5 | 3.5 |
| $H_2$ (ppm mol) | 1450 | 1450 |

A solution of random copolymer dissolved in butene-1 is continuously withdrawn from the second reactor at a flow rate of 26 t/h. The polymer concentration is of 21.5% by weight.

A sample of polymeric solution is taken away at the outlet of the second reactor in order to evaluate the Melt Flow Index (MIE) and Polydispersity index (PI) of the obtained random copolymer. The values are shown in table C.

Deactivation

Step B

The polyolefin solution is transferred to the deactivation apparatus for the killing of the catalyst residues: an amount of 2.0 kg/h of $H_2O$ is continuously fed to the top of the deactivation apparatus.

Separation and Monomer Recovery

Step C

Once deactivated, the polymeric solution is successively pressurized by means of a screw pump and is then subjected to heating in the sequence of two multi-tube heat exchangers. The temperature at the outlet of the second heat exchanger is 210° C. and a mixture of polyolefin melt and gaseous monomers is obtained. Said mixture is fed to the inlet of a first devolatilization chamber, operated a temperature of 210° C. and a pressure of 7 bar. The polybutene-1 melt settles by gravity to the bottom of the chamber, while the gaseous monomers flow upward. A mixture of IRGANOX® 1010 (50% wt) and IRGANOX® 1076 (50% wt) is introduced into the first volatilizer according to the first embodiment of present invention (shown in FIG. 1). Said mixture is fed a T=75° C. and a flow rate of 4.47 kg/h (800 ppm wt referred to the polymer).

The second devolatilization chamber is operated under vacuum at 210° C. and 25 mbar. At the outlet of the second volatilizer the content of butene-1 in the polybutene-1 melt is measured obtaining a value of only 60 ppm weight.

The polybutene-1 melt is compounded in an extruder and finally, the compounded polybutene-1 melt is conveyed to an underwater pelletizer to be cut into pellets. The values of MIE and PI of the obtained PB-1 pellets are reported in Table C.

Example 5

The same solution of butene-1 random copolymer obtained by Example 4 is subjected to catalyst deactivation according to same modality described in Example 4.

Once deactivated, the polyolefin solution is pressurized by means of the screw pump before to be subjected to heating in two multi-tube heat exchangers.

According to the second embodiment of present invention (shown in FIG. 2), a mixture of IRGANOX® 1010 (50% wt) and IRGANOX® 1076 (50% wt) is fed to the polymer solution downstream the screw pump and upstream the first heat exchanger. Said mixture is fed a T=75° C. and a flow rate of 4.47 kg/h (800 ppm wt referred to the polymer).

The temperature at the outlet of the second heat exchanger is 210° C. and a mixture of polyolefin melt and gaseous butene-1 is obtained. Said mixture is fed to the inlet of a first devolatilization chamber, operated a temperature of 210° C. and a pressure of 7 bar. The polybutene-1 melt settles by gravity to the bottom of the chamber, while the gaseous butene-1 flows upward.

The second devolatilization chamber is operated under vacuum at 210° C. and 25 mbar. The polybutene-1 melt is compounded in an extruder and finally, the compounded polybutene-1 melt is conveyed to an underwater pelletizer to be cut into pellets.

The values of MIE and PI of the obtained PB-1 pellets are reported in Table C.

Example 6

Comparative

The same solution of butene-1 random copolymer obtained by Example 4 is subjected to catalyst deactivation according to same modality described in Example 4.

Once deactivated, the polymeric solution is pressurized by means of a screw pump before to be subjected to heating in the same multi-tube heat exchangers of previous examples.

At the outlet of the second heat exchanger a mixture of polybutene-1 melt and gaseous butene-1 is obtained. Said mixture is fed to the inlet of a first devolatilization chamber, operated a temperature of 210° C. and a pressure of 7 bar. The polybutene-1 melt settles by gravity to the bottom of the chamber, while the gaseous butene-1 flows upward.

The PB-1 melt is therefore discharged from the bottom of the first volatilizer and is introduced into a heat exchanger in order to raise its temperature up to the value requested into the second devolatilization chamber.

The second devolatilization chamber is operated under vacuum at 210° C. and 25 mbar. At the outlet of the second volatilizer the polybutene-1 melt is sent to an extruder, where it is additivated with a mixture of IRGANOX® 1010 (50% wt) and IRGANOX® 1076 (50% wt). Said mixture is fed a T=165° C. and a flow rate of 4.47 kg/h.

Finally, the compounded polybutene-1 melt is conveyed to an underwater pelletizer to be cut into pellets.

The values of MIE and PI of the obtained PB-1 pellets are reported in Table C. It may be observed that the final pellets show a considerable MIE shift and PI shift.

TABLE C

|  | Antioxidant compound | Amount (ppm wt) | MIE$^{(A)}$ | MIE$^{(B)}$ | PI$^{(A)}$ | PI$^{(B)}$ |
| --- | --- | --- | --- | --- | --- | --- |
| Ex. 1 | IRGANOX 1010/1076 | 500 | 0.35 | 0.37 | 7.0 | 7.0 |
| Ex. 2 | IRGANOX 1010/1076 | 500 | 0.35 | 0.37 | 7.0 | 7.0 |
| Ex. 3 (comp) | IRGANOX 1010/1076 | 500 | 0.35 | 0.45 | 7.0 | 6.0 |
| Ex. 4 | IRGANOX 1010/1076 | 800 | 2.8 | 3.0 | 4.5 | 4.5 |
| Ex. 5 | IRGANOX 1010/1076 | 800 | 2.8 | 3.0 | 4.5 | 4.5 |
| Ex. 6 (comp) | IRGANOX 1010/1076 | 800 | 2.8 | 3.6 | 4.5 | 4.0 |

MIE$^{(A)}$ measured downstream the polymerization step
PI$^{(A)}$ measured downstream the polymerization step
MIE$^{(B)}$ measured downstream pelletization
PI$^{(B)}$ measured downstream pelletization

The invention claimed is:

1. A process for the polymerization of at least one α-olefin under solution polymerization conditions comprising the steps of:
   (a) polymerizing said at least one α-olefin in a solution phase in the presence of a polymerization catalyst to produce a polymeric solution;
   (b) deactivating the polymeric solution by conveying the polymeric solution to a deactivation tank, wherein a catalyst deactivator is mixed with the polymeric solution to produce a deactivated polymeric solution comprising the catalyst deactivator, a produced polyolefin, and unreacted monomers; and
   (c) devolatilizing the deactivated polymeric solution by separating the produced polyolefin from the unreacted monomers in a first devolatilization chamber and a second devolatilization chamber;
   adding 300 to 2000 ppm by weight of an antioxidant with respect to the polyolefin produced in step (a) to said polymeric solution, or inside of the first devolatilization chamber of step (c).

2. The process according to claim 1, wherein in step (c) said first devolatilization chamber is operated at a pressure higher than atmospheric pressure, while the second devolatilization chamber is operated under vacuum.

3. The process according to claim 1, wherein the polymer solution is discharged from said deactivation tank and is transferred by means of a screw pump to the separation step (c).

4. The process according to claim 3, wherein said at least one antioxidant compound is added to the polymer along the line connecting said screw pump to said first volatilization chamber of step (c).

5. The process according to claim 1, wherein said at least one antioxidant compound is fed in an amount from 500 to 1200 ppm by weight with respect to the polyolefin produced in said polymerization step (a).

6. The process according to claim 1, wherein said at least one antioxidant compound is added to the polymer in a liquid state at a feeding temperature ranging from 50° C. to 100° C.

7. The process according to claim 1, wherein said at least one antioxidant compound is selected from the group consisting of sterically hindered phenols, phosphites, and thioesters.

8. The process according to claim 7, wherein said sterically hindered phenols are selected from the group consisting of:
   tetrakismethylene(3,5-di-t-butyl-4-hydroxyhydrocinnamate) methane,
   octadecyl 3-(3',5'-di-butyl-4' hydroxyphenyl) propionate,
   1,3,5-tris(3,5-di-t-butyl-4-hydroxybenzyl)benzene
   1,3,5-tris(3,5-di-t-butyl-4-hydroxybenzyl)isocyanurate;
   2,6-bis(α-methylbenzyl)-4-methylphenol;
   1,3,5-tris(4-tert-butyl-3-hydroxy-2,6-dimethylbenzyl)-1,3,5-triazine-2,4,6-(1H,3H,5H)-trione;
   2,2'-methylenebis(4-ethyl-6-tert-butylphenol); and
   2,2'-methylenebis(4-methyl-6-tert-butylphenol).

9. The process according to claim 7, wherein said phosphites are selected from the group consisting of:
   tris(2,4-di-t-butyl phenyl) phosphite;
   bis(2,4-ditertbutylphenol)pentaerythritol diphosphite;
   tris(nonylphenyl)phosphite;
   2,4,6-tri-t-butylphenyl-2-butyl-2-ethyl-1,3-propane-diol-phosphite; and
   bis(2,4-dicumylphenyl)pentaerythritol diphosphite.

10. The process according to claim 7, wherein said thioesters are an dialkyl ester of thiodipropionic acid and didodecyl-3,3'-thiodipropionate.

* * * * *